(12) United States Patent
Sano

(10) Patent No.: US 7,238,272 B2
(45) Date of Patent: Jul. 3, 2007

(54) PRODUCTION OF ELECTROLYTIC WATER

(76) Inventor: Yoichi Sano, 3-13-50 Shinjuku, Zushi, Kanagawa 249-0007 (JP)

(*) Notice: Subject to any disclaimer, the term of this patent is extended or adjusted under 35 U.S.C. 154(b) by 403 days.

(21) Appl. No.: 10/789,734

(22) Filed: Feb. 27, 2004

(65) Prior Publication Data

US 2005/0189237 A1    Sep. 1, 2005

(51) Int. Cl.
*C02F 1/461* (2006.01)
(52) U.S. Cl. ............... 205/701; 205/746; 205/747; 204/252; 204/263
(58) Field of Classification Search ........... 205/701, 205/746, 747; 204/252, 263
See application file for complete search history.

(56) References Cited

U.S. PATENT DOCUMENTS

| | | | |
|---|---|---|---|
| 5,616,221 A | 4/1997 | Aoiki et al. | |
| 6,235,186 B1 | 5/2001 | Tanaka et al. | |
| 6,274,009 B1 | 8/2001 | Krafton et al. | |

FOREIGN PATENT DOCUMENTS

| | | |
|---|---|---|
| EP | 0 823 400 A1 | 2/1998 |
| EP | 1 386 887 A1 | 2/2004 |
| JP | 2000 246249 A | 9/2000 |
| JP | 2000246249 * | 9/2000 |
| JP | 2001 286868 A | 10/2001 |
| JP | 2001286868 * | 10/2001 |

* cited by examiner

Primary Examiner—Arun S. Phasge
(74) Attorney, Agent, or Firm—Kirkpatrick & Lockhart Preston Gates Ellis LLP

(57) ABSTRACT

Apparatus and methods are provided for producing electrolytic water using three chambers, rigid plates and ion exchange membranes. Benefits include reduced scale production and increased long-term bactericidal effects of the water produced.

22 Claims, 9 Drawing Sheets

PRODUCTION OF ELECTROLYTIC WATER

FIELD OF THE INVENTION

The invention pertains to the production of acidic electrolytic water and alkaline electrolytic water by electrolyzing water.

BACKGROUND

Acidic electrolytic water and alkaline electrolytic water have been produced by electrolyzing water that has a small amount of an electrolyte added. Acidic electrolytic water produced by this method has a hydrogen ion concentration (pH) in a range of 2.0 to 3.5 (generally 2.2 to 3.0), shows at least 1100 mV oxidation reduction potential (ORP), and contains at least 10 ppm free chlorine (also known as effective chlorine; primarily hypochlorous acid below pH 7). Because this type of acidic electrolytic water contains free chlorine, it is strongly acidic and has a high oxidation reduction potential, it has a potent bactericidal effect on *E. coli* and other bacteria, and has begun to be widely used in recent years in fields such as medicine, agriculture, and dairy farming. Because it has a pH in a range of 10.5 to 12.0 and is strongly alkaline, alkaline electrolytic water also has a potent emulsifying effect on dirt containing oil or proteins and thus is useful in cleaning oil or grease contaminated articles.

Methods employed for producing acidic electrolytic water and alkaline electrolytic water by electrolyzing water include (1) a method of electrolyzing by using a water electrolyzer having an anode chamber and a cathode chamber separated by a membrane and conducting the feed water with an electrolyte added beforehand through the anode chamber and the cathode chamber, and (2) a method of electrolyzing by using a water electrolyzer having the three chambers of an anode chamber, an intermediate chamber, and a cathode chamber separated by two membranes, filling the intermediate chamber with a concentrated electrolyte, and conducting the feed water through the anode chamber and the cathode chamber.

Whether acidic or alkaline, the desired attributes of electrolytic water differ considerably, depending on the purpose of use or application. For example, when using acidic electrolytic water for medical applications such as disinfecting endoscopes, the content of free chlorine governing the bactericidal effect of the water is important, but even a highly concentrated electrolyte content (typically sodium or potassium chloride) poses few problems. When acidic electrolytic water is used in agricultural applications, however, the electrolyte content should be low, so as to avoid residues. In addition, strong odor is a problem when used to disinfect the oral cavity such as in dentistry or as a mouthwash. Corrosion can also be a problem depending on the type of metals used when disinfecting or washing. Thus, there are many application-specific demands on acidic electrolytic water and alkaline electrolytic water. Previous attempts to respond to these demands has required modifying the basic design specifications of water electrolyzers to provide attributes most suited to the contemplated use.

In addition to application-specific requirements, previous methods for producing acidic electrolytic water and alkaline electrolytic water by electrolyzing water also have many general problems, such as (1) poor electrolysis efficiency and high power consumption, (2) difficulty in controlling the free chlorine content in acidic electrolytic water, (3) corrosion and salt damage caused by a high electrolyte (i.e., salt) content in acidic electrolytic water, and (4) scale adhering to the electrodes due to electrolysis, resulting in decreasing efficiency as the scale builds up.

Although acidic electrolytic water produced by previous methods is in great demand in fields seeking to take advantage of its superior bactericidal effect, the greatest drawbacks of this water are the short duration of its bactericidal effect and its high corrosiveness to metals such as medical instruments. The reason for the short duration of the bactericidal effect of the acidic electrolytic water produced by previously-known methods is that free chlorine tends to evaporate in the form of chlorine gas ($Cl_2$), while the high electrolyte content in acidic electrolytic water may be cited as one factor causing corrosion of metals and residual salt deposits. Acidic electrolytic water produced by adding an electrolyte to the feed water beforehand and conducting this mixture through the electrolyzer produces water that contains from 500 ppm to 1000 ppm salt content. Produced in this way, the bactericidal effect of acidic electrolytic water is of short duration (usually one week or less) and it tends to corrode metals.

Japanese Patent Application No. 3113645 and Japanese Unexamined Patent No. 2001-286868 describe methods of electrolysis using three chambers: an anode chamber, a cathode chamber, and an intermediate chamber placed between the anode chamber and the cathode chamber, with a concentrated electrolyte solution in the intermediate chamber; supplying the water for electrolysis to both the anode chamber and the cathode chamber; and having a membrane separating the intermediate chamber from the anode chamber and a second membrane separating the intermediate chamber from the cathode chamber. In this embodiment the membranes deform when the pressure fluctuates. Deformation also occurs over time due to the swelling property of ion exchange membranes. Eventually, the degree of deformation exceeds the permissible range due to prolonged repetition of this deformation, and the membranes break. The deformation also causes the electrical resistance during electrolysis to fluctuate greatly due to changes in the distance between the electrode plates and the membranes. In addition, if the amount and electrolyte concentration of the solution within the electrolysis chambers fluctuates greatly, for example, from fluctuations in feed water pressure, electrolysis may fail. As a result, it becomes difficult to produce electrolytic water in a reliable and well-controlled manner and improvements are needed to ameliorate these general difficulties, as well as to provide a greater ability to modify the characteristics of the electrolytic water in order to better meet application-specific requirements.

SUMMARY OF THE INVENTION

A method is described for production of electrolytic water, employing the system of first dividing the feed water supplied to the anode into water for electrolysis and water not for electrolysis, conducting the water for electrolysis through the anode chamber to be electrolyzed, mixing the electrolytic water discharged from the anode chamber with the water not for electrolysis, and second, dividing the feed water supplied to the cathode into water for electrolysis and water not for electrolysis, conducting the water for electrolysis through the cathode chamber to be electrolyzed, and mixing the electrolytic water discharged from the cathode chamber with the water not for electrolysis. Electrolysis is conducted by charging the anode plate and the cathode plate with at least 1500 coulombs of direct current per liter of electrolytic water actually electrolyzed. This method can increase free chlorine production efficiency and prevent adhesion of scale to the electrodes.

Also described herein is a method of producing electrolytic water using an electrolyzer provided with an anode chamber, a cathode chamber, and an intermediate chamber between the anode chamber and the cathode chamber separated from the latter two chambers by two membranes. Contact between negative electrolyte ions (e.g., chloride ions) and the anode plate is increased by increasing the number of anode plates placed in the anode chamber. This raises the reaction efficiency of the anode and increases production of chlorine gas, as well as hypochlorous acid, which is the reaction product of water with chlorine gas. This method can produce acidic electrolytic water of about pH 3 to about pH 5 with at least 15 ppm free chlorine content and no more than 100 ppm chloride ion concentration. This electrolytic water has the properties of a long-lasting bactericidal effect and decreased corrosion of metals.

In contrast, described herein is a method of producing electrolytic water by using an electrolyzer also comprising an anode chamber, an intermediate chamber, and a cathode chamber. The intermediate chamber, however, is constructed by creating small holes in the sides contacting the anode chamber and the cathode chamber, allowing an electrolyte solution to flow in the intermediate chamber, but in addition, embodying rigid plates capable of supplying an electrolyte to both sides and contacting the two rigid plates together, where each of the rigid plates has striped depressions and projections on the intermediate chamber side, with holes of more than 3 mm in diameter in these depressions. The two rigid plates are in contact with each other such that the ends of the projections on each rigid plate contact those on the other plate, thereby assuring a channel for electrolytic solution to flow in the intermediate chamber. The intermediate chamber is therefore formed in the space existing in the depressions between the two rigid plates which are in contact with each other. The two rigid plates can be held or bound together by laminating or gluing them together, or they can be pressed together and clamped in contact with one another.

The electrolytic solution flowing in the intermediate chamber is allowed to be fed to the sides of the anode chamber and the cathode chamber through the holes. A membrane separates the anode chamber from the intermediate chamber and a membrane separates the cathode chamber from the intermediate chamber on the sides of the rigid plates. Anode plates are placed in the anode chamber and cathode plates are placed in the cathode chamber. An electrolytic solution flows in the intermediate chamber. The feed water supplied to the anode is divided into water for electrolysis and water not for electrolysis, the water for electrolysis is conducted through the anode chamber to be electrolyzed, and the electrolytic water discharged from the anode chamber is mixed with the water not for electrolysis. The feed water supplied to the cathode is divided into water for electrolysis and water not for electrolysis, the water for electrolysis is conducted through the cathode chamber to be electrolyzed, and the electrolytic water discharged from the cathode chamber is mixed with the water not for electrolysis. The electrolyte solution stored in the above-mentioned intermediate chamber is supplied to the above-mentioned water for electrolysis by electrophoresis, and electrolysis is conducted by charging the anode plate and the cathode plate with at least 1500 coulombs of direct current per liter of electrolytic water.

Further described herein is a method for the production of electrolytic water in which the membrane separating the anode chamber from the intermediate chamber is an anion exchange membrane, and the anode plates have at least two electrode plates.

Also further described is a method for the production of electrolytic water, in which the membrane separating the cathode chamber from the intermediate chamber is a cation exchange membrane, and the cathode plates have at least two electrode plates.

DETAILED DESCRIPTION

Figure 1:
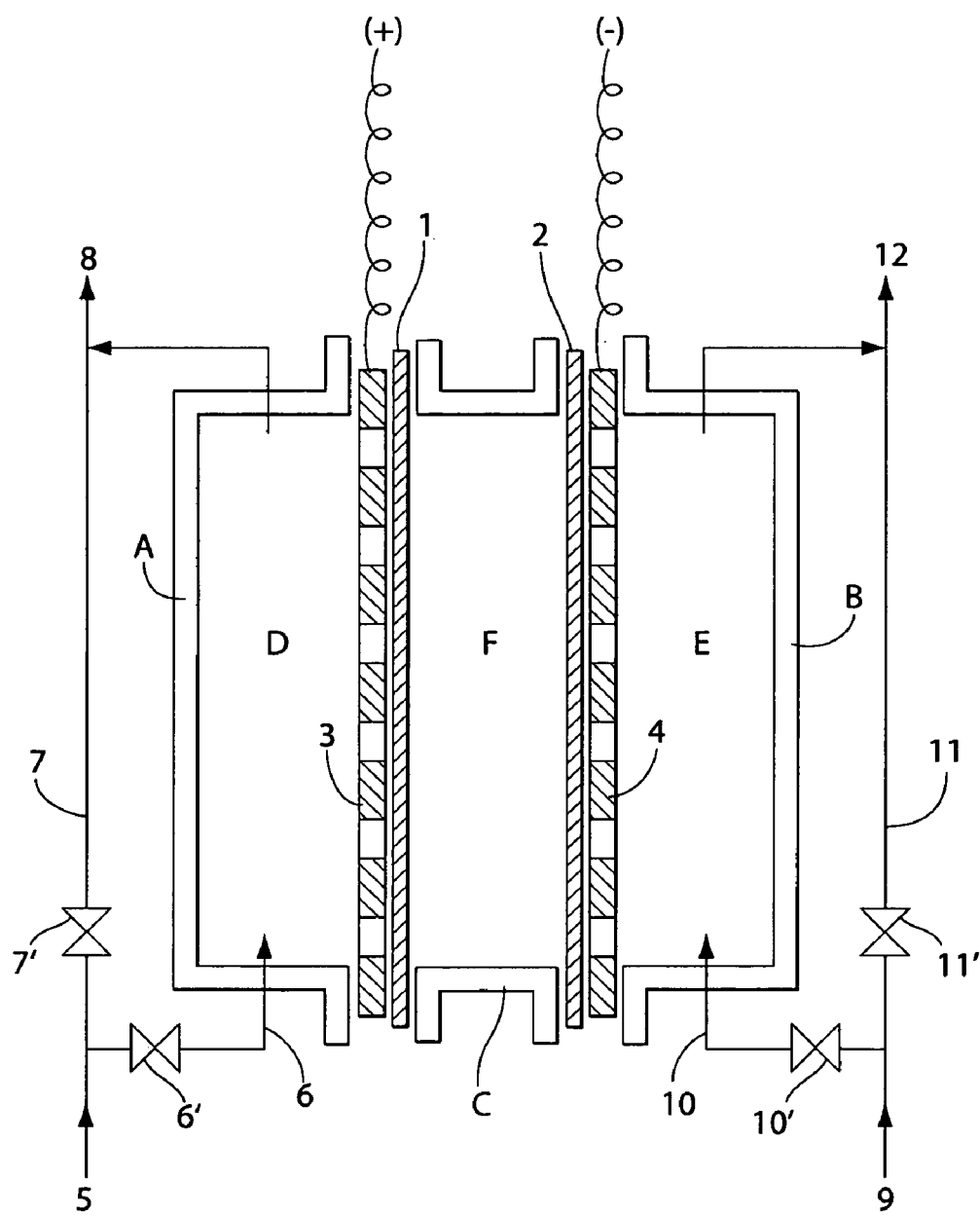
FIG. 1 is a cross section of a water electrolyzer according to an embodiment of the invention.
Figure 3:
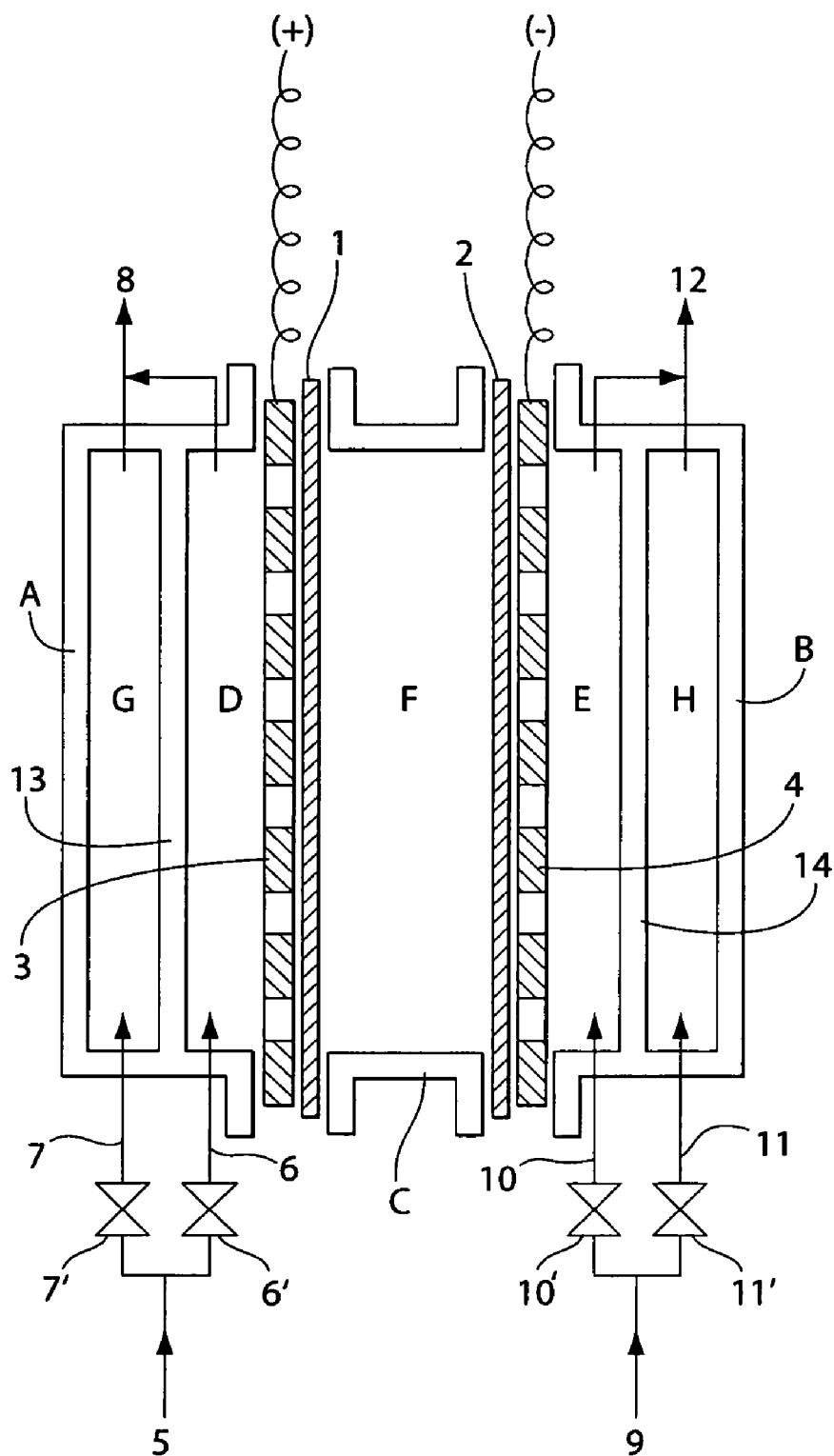
FIGS. 3 to 5 are cross sections of water electrolyzers used in the production of electrolytic water in various embodiments of the invention.

Unlike systems in which acidic electrolytic water and alkaline electrolytic water containing free chlorine are produced by conducting water having a small amount of salt added to the feed water through an anode chamber and a cathode chamber separated by one membrane, the present invention relates to a method for conducting only a portion of the feed water through the anode chamber and the cathode chamber, thereby minimizing the solution transport phenomenon by electrolyzing with a direct current per unit of electrolytic water of at least 1500 coulombs/liter. This direct current per unit of electrolytic water is markedly greater than previously practiced, increasing electrolysis efficiency by preventing adhesion of scale to the anode, and producing a high concentration of strongly acidic electrolytic water and strongly alkaline electrolytic water. This high concentration of strongly acidic electrolytic water and strongly alkaline electrolytic water are then each mixed separately with feed water to dilute them to obtain acidic electrolytic water and alkaline electrolytic water with the pH desired for a specific application. Moreover, the method produces electrolytic water reliably and consistently, without causing deformation or breakage of the membranes, even during prolonged use and even when the hydrostatic pressure of the feed water fluctuates. FIGS. 1 and 3 show the water electrolyzer used to practice this method.

FIG. 1 is a cross section of a water electrolyzer provided with the three chambers including an anode chamber, an intermediate chamber, and a cathode chamber, separated by two membranes. External walls of the electrolyzer are (A), (B), and (C). The anode chamber is (D), (E) is the cathode chamber, and (F) is the intermediate chamber. Anode chamber (D) and intermediate chamber (F) are separated by membrane (1), and intermediate chamber (F) and cathode chamber (E) are separated by membrane (2). Electrode plates are anode plate (3) and cathode plate (4). Anode plate (3) is placed in anode chamber (D), and cathode plate (4) is placed in cathode chamber (E). Anode plate (3) can be separated or adhered to membrane (1), and cathode plate (4) can be separated or adhered to membrane (2). These are shown adhered in FIG. 1. When adhered, each electrode plate has holes in it and the side contacting the membrane coated by a nonconductive material, or a sheet-form nonconductive material with the same holes as the electrode plate, may be inserted between each electrode plate and each membrane.

Figure 2:
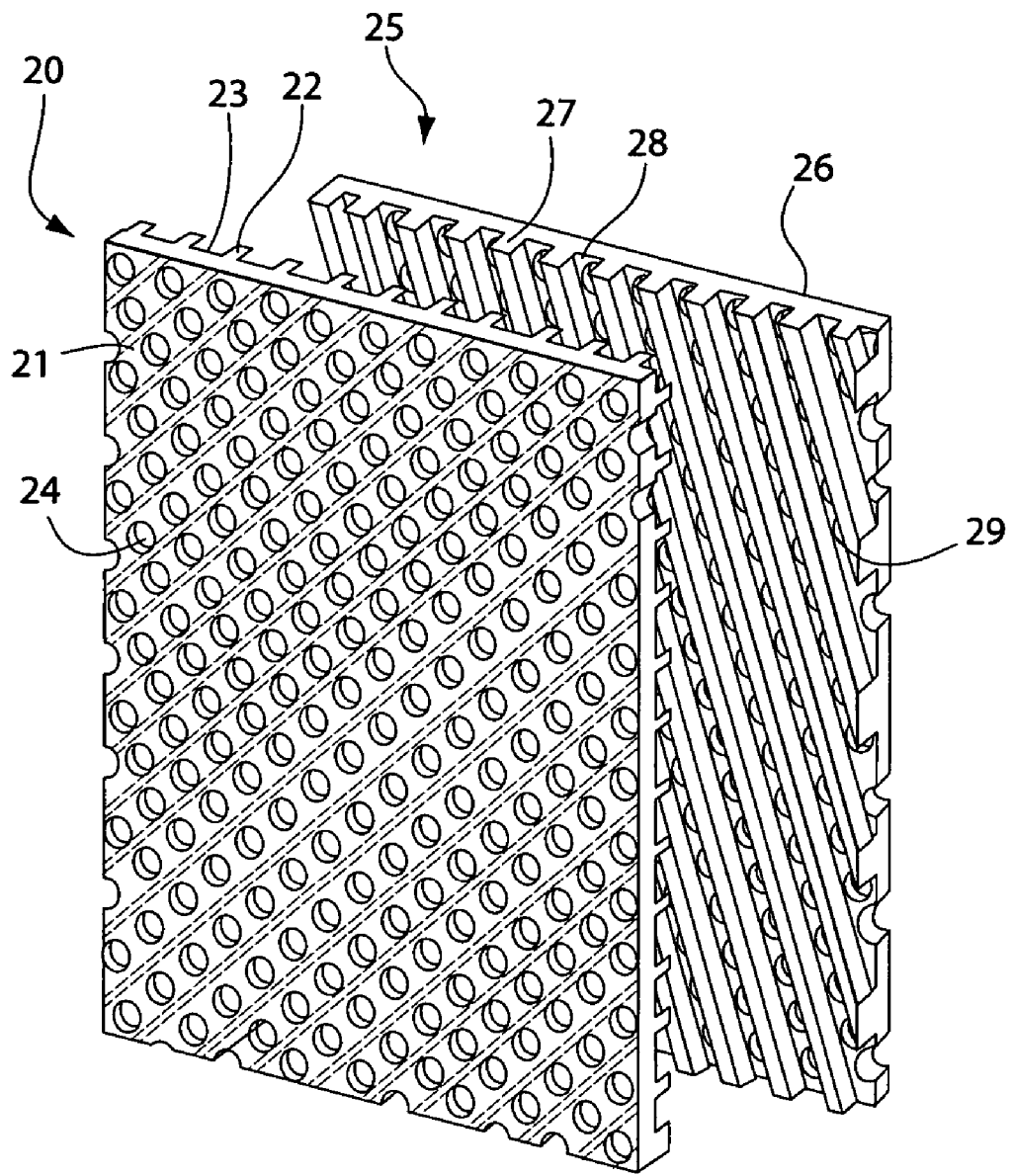
FIG. 2 is a perspective diagram of synthetic resin plates adhered to membranes in an electrolytic chamber used by the electrolysis method in an embodiment of the invention.

In FIG. 1, membrane (1) and membrane (2) may be installed inside the electrolyzer tightly adhered to rigid plates (not shown in FIG. 1) comprised of a hard base material, such as, but not limited to, synthetic resin, plastic or ceramic. FIG. 2 is a perspective diagram of one of these rigid plates, two of which are used together. Rigid plate (20) is shown adhered to membrane (1). Rigid plate (20) has a smooth surface (21) on one side, and striped projections (22) and depressions (23) formed on the other side. Holes of 3-mm diameter or smaller (24) are made in these depressions (22). Membrane (1) may be adhered to the smooth surface (21) of rigid plate (20), and the side of rigid plate (20), with striped depressions and projections, may be placed on the side toward the intermediate chamber. Rigid plate (25) is shown adhered to membrane (2). Rigid plate (25) has a smooth surface (26) on one side, and striped projections (27) and depressions (28) formed on the other side. Holes of 3-mm or smaller diameter (29) are made in these depressions (28). Membrane (2) is adhered to the smooth surface (26) of rigid plate (25), and the side of rigid plate (25) with striped depressions and projections is placed on the side toward the intermediate chamber.

Because membrane (1) separating the anode chamber from the intermediate chamber and membrane (2) separating the intermediate chamber from the cathode chamber are adhered to rigid plates (20) and (25) formed with striped depressions and projections on the inside, they are not deformed beyond the permissible limit over time or due to fluctuation in hydrostatic pressure, and they allow consistent electrolysis. As a result, electrolytic water satisfying specific conditions can be produced reliably and consistently. The striped depressions and projections are placed so as to assure the channel required for an electrolyte aqueous solution to flow into and out of the intermediate chamber. In addition, the thickness of the overlapping striped projections of rigid plates (20) and (25) preferably matches the width of the intermediate chamber. Matching these dimensions in this way can effectively minimize torsion of membranes (1) and (2), and simplifies the construction of the intermediate chamber. The rigid plates can be made out of any material that is hard and nonconductive, such as synthetic resin (e.g., polypropylene), hard plastic or a ceramic. The holes in the striped depressions can be drilled or bored after the rigid plate is manufactured, or can be formed during the manufacturing of the rigid plate.

FIG. 3 shows the feed water (5) on the anode side in FIG. 1 is divided into water for electrolysis (water to be electrolyzed) (6) and water not for electrolysis (water not to be electrolyzed) (7). Water for electrolysis (6) is conducted through anode chamber (D), and after electrolyzing, is mixed and diluted with water not for electrolysis (7) to produce acidic electrolytic water (8) with a specific pH from about 2.0 to about 3.0. Feed water (9) on the cathode side is also divided into water for electrolysis (10) and water not for electrolysis (11). Water for electrolysis (10) is conducted through cathode chamber (E), and after electrolyzing, is mixed and diluted with water not for electrolysis (11) to produce alkaline electrolytic water (12) with a specific pH from about 10.5 to about 12.0.

Valves (6'), (7'), (10'), and (11') are valves for adjusting the amount of water allowed into the respective chambers. Intermediate chamber (F) is filled with a highly concentrated aqueous electrolyte solution. Normally, an aqueous solution of at least 10% potassium chloride or sodium chloride is used, and can be supplied from an electrolytic aqueous solution tank installed separately using a pump, or the like. In addition, the method used to conduct water for electrolysis (6) and (10) in this example can be to introduce these from inlets on the bottom of anode chamber (D) and cathode chamber (E) and remove water and gas products after electrolysis from outlets on the top. Preferably, however, these can also be introduced by replacing water and gas products after electrolysis removed from outlets on the top. The amount of water for electrolysis introduced by displacement in this way is close to the volume of gas produced by the anode and the cathode, and is therefore the minimum calculated by Formulae (I) and (II) described below.

The amount of water for electrolysis (6) and (10) conducted to anode chamber (D) and cathode chamber (E) during electrolysis is shown by Formulae (I) and (II) described below. The desired maximum flow is about 40 milliliters/minute at a current of about 1 A (ampere), and this maximum is reverse-calculated from 1500 coulombs/liter. When electrolyzing under the conditions described above, the anions such as chloride ions contained in the aqueous electrolyte solution residing in the intermediate chamber (F) are transferred into anode chamber (D) by electrophoresis based on the transport number of each such ion. Electrolyzing anions such as chloride ions and water on the electrode surface produces strongly acidic electrolytic water with a pH of about 1.9 or lower and the gases oxygen and chlorine (in the case where chloride ion is used). This strongly acidic electrolytic water is expelled from anode chamber (D) and mixed with water not for electrolysis (7) to produce acidic electrolytic water (8). Likewise on the cathode side, cations such as sodium contained in the electrolytic aqueous solution residing in the intermediate chamber (F) are transferred by electrophoresis based on the transport number of each ion, and cations and water are electrolyzed on the electrode surface to produce strongly alkaline electrolytic water with a pH of about 12 or higher. This strongly alkaline electrolytic water is expelled from cathode chamber (E) and mixed with water not for electrolysis (11) to produce alkaline electrolytic water (12) with the intended pH (for example, pH of about 10.5 to about 12.0).

The reason for applying a direct current of at least 1500 coulombs/liter to the water for electrolysis in this invention is that as a result of investigating the current flow required to prevent the water transport phenomenon, which is one of the factors reducing electrolysis efficiency, it was found that production efficiency of free chlorine increased at 1500 coulombs/liter or greater, and no scale adhered to the anode at or above this level of 1500 coulombs/liter.

In addition, the minimum amount of this water for electrolysis is the amount sufficient for replacing the gas produced at the anode and the cathode during electrolysis; that is, the amount approximating the amount of gas production that can be calculated by Faraday's law. The amount of gas produced at an anode in standard state at a current of 1 A (ampere) calculated by Faraday's law is 3.49 milliliters/minute, and the amount of gas produced at a cathode is 6.98 milliliters/minute.

Assembling the conditions described above as an approximation formula, the range of minimum to maximum amount of water for electrolysis is given by the following Formulae (I) and (II):

$$\text{water for electrolysis on the anode side (milliliters/minute)} = 3.5 \times A \text{ to } 40 \times A \quad (I);$$

$$\text{water for electrolysis on the cathode side (milliliters/minute)} = 7.0 \times A \text{ to } 40 \times A \quad (II);$$

where A is the amperage of the electrolyzing current.

Within the anode chamber, water and chloride ions react on the anode surface based on the following reaction formulae:

$$2H_2O - 4e^- \rightarrow O_2 + 4H^+ \quad (III);$$

$$2Cl^- - 2e^- \rightarrow Cl_2 \quad (IV);$$

$$4H_2O \rightleftharpoons 4H^+ + 4OH^- \quad (V);$$

$$4OH^- - 4e^- \rightarrow O_2 + 2H_2O \quad (VI).$$

Chlorine gas produced by the reaction of Formula (IV) reacts with water to produce hydrochloric acid and hypochlorous acid based on Formula (VII). In addition, some of the hypochlorous acid is disassociated into oxygen ions and hypochlorite ions by an equilibrium reaction based on Formula (VIII):

$$Cl_2 + H_2O \rightleftharpoons HCl + HClO \quad (VII);$$

$$HClO \rightleftharpoons H^+ + ClO^- \quad (VIII).$$

Next, after electrolyzing the water for electrolysis, control of the pH and the free chlorine content can be facilitated by dilution with unelectrolyzed water.

The pH and free chlorine content can be easily adjusted because electrolysis conditions are set by the current and the amount of water for electrolysis, while non-electrolyzed water can be used freely regardless of electrolysis conditions. That is, acidic electrolytic water and alkaline electrolytic water of the desired pH and free chlorine content can be obtained by adjusting valves (6') and (7') on the anode side and valve (11') on the cathode side in FIG. 1.

Free chlorine content in acidic electrolytic water is increased by the methods described herein. The amount of water for electrolysis on the anode side in this invention (milliliters/coulombs) is a maximum of forty times the current (amperes). This means that if one liter/minute of water for electrolysis is produced by a current charge of seven amperes, the maximum amount of water conducted to the anode chamber is 280 milliliters/minute, and the chloride ion concentration supplied to the anode chamber by electrophoresis is much greater relative to the current than under previously-used conditions. As a result, acidic electrolytic water with a high free chlorine content can be produced.

Besides easily increasing the free chlorine content, the method of this invention also allows easy adjustment of the free chlorine content by changing the amount of water for electrolysis (6) and changing the ratio with water not for electrolysis (7). That is, free chlorine content is highest when the amount of water for electrolysis (6) is the minimum given by Formula (I), and the free chlorine content can be reduced as the water for electrolysis (6) is increased.

Power efficiency may also be improved by the methods described herein. As explained above, the current flow relative to the amount of water for electrolysis is increased. The resulting high ion concentration (which results in high electrical conductivity) of the water for electrolysis in the anode chamber and the cathode chamber means that the voltage is reduced, making it possible to improve power efficiency. Moreover, when the chloride ion concentration in water is high, water molecules become associated with ions, and the phenomenon of solution transport migrating from the anode to the cathode can be minimized.

Adhesion of scale to the cathode may also be decreased. The main electrolysis reactions occurring at the cathode are as follows:

$$2H_2O + 2e^- \rightarrow H_{2+} 2OH^- \quad (IX);$$

$$Na^+ + e^- \rightarrow Na \quad (X);$$

$$2Na + 2H_2O \rightarrow 2Na^+ + 2OH^- + H_2 \quad (XI).$$

As shown in the reaction formulae given above, hydroxyl ions and hydrogen gas are produced at the cathode, metallic ions such as sodium ions are reduced to become metals, and the phenomenon of these substances reacting with water occurs. If the water contains ions such as calcium or magnesium at the time of electrolysis, these ions are also reduced to metals, and components such as calcium and magnesium, by further reaction, produce hydroxides. As a result, these compounds are often deposited on the surface of the electrode as scale.

The phenomenon of scale adhering to the cathode during electrolysis in this way has been generally considered unavoidable, and measures such as removing hard components contained in feed water using water softening equipment or the like, scrubbing scale adhering to the electrode using an acid, or removing scale by reversing the polarity of the electrode, all have been adopted as measures for preventing adhesion.

The current flow through the water for electrolysis conducted through the cathode chamber when producing alkaline electrolytic water by prior art methods is about 12 amperes per liter (720 coulombs/liter), but precipitation of scale onto the surface of the cathode is often observed under these conditions. However, in using the methods described herein, scale does not precipitate onto the electrode surface when the current flow through the water is at least 1500 coulombs/liter, and preferably at least 1800 coulombs/liter, and the cathode chamber is strongly alkaline with, at least 12.1 pH. It is believed that the reason for this is that many scale components are dissolved, or inhibited from precipitating as crystals, under strongly alkaline conditions.

FIG. 3 also shows the electrolysis method of FIG. 1 fashioned such that the heat generated during electrolysis is removed by using water not for electrolysis (7) and (11) to cool the electrolyzer.

In FIG. 3, (A), (B), and (C) are external walls of the electrolyzer. This electrolyzer is divided from left to right into water channel (G), anode chamber (D), intermediate chamber (F), cathode chamber (E), and water channel (H) by membranes (1) and (2) and partition plates (13) and (14). Water channel (G) is enclosed by electrolyzer external wall (A) and partition plate (13). Partition plates (13) and (14) are made of a base material such as a metal, synthetic resin or ceramic. The construction and layout of the synthetic resin plates adhered to the anode chamber, the cathode chamber, and the two membranes are as described in FIG. 2.

Feed water (5) on the anode side is divided into water for electrolysis (6) and water not for electrolysis (7). Water for electrolysis (6) is conducted through anode chamber (D), and water not for electrolysis (7) is conducted through water channel (G). Finally, water electrolyzed after conducting through anode chamber (D) is mixed with water not for electrolysis (7) to produce the desired acidic electrolytic water (8).

Feed water (9) on the cathode side is also divided into water for electrolysis (10) and water not for electrolysis (11). Water for electrolysis (10) is conducted through cathode chamber (E), and water not for electrolysis (11) is conducted through water channel (H). Finally, water electrolyzed after being conducted through anode chamber (E) is mixed with water not for electrolysis (11) to produce the desired alkaline electrolytic water (12). The water conducted through water channels (G) and (H) has the effect of cooling the electrolytic bath. Valves (6'), (7'), (10'), and (11') are valves for adjusting the amount of water allowed into the chambers. Intermediate chamber (F) is filled with a highly concentrated aqueous electrolytic solution as described in FIG. 1.

Electrolyzed water on both the anode side and the cathode side (that is, strongly acidic electrolytic water and strongly alkaline electrolytic water) may be mixed with the water conducted through water channels (G) and (H) as shown in in FIG. 3, where the water is expelled from the electrolytic bath, or may be mixed through holes near the top outlet of partition plates (13) and (14). Furthermore, there are three methods for introducing water for electrolysis (6) and (10) into anode chamber (D) and cathode chamber (E): (i) water may be introduced directly from inlets formed in the bottom of both anode chamber (D) and cathode chamber (E) as shown in FIG. 3, (ii) holes may be bored in the bottom of partitions plates (13) and (14) and feed water (5) and (9) may be introduced first into channels (G) and (H), then into anode chamber (D) and cathode chamber (E) through these holes, or (iii) holes may be made in the top of partition plates (13) and (14) and water may be introduced from these holes by replacing electrolyzed water and gas. The amount of water for electrolysis (6) and (10) conducted through the chambers when replacing water in this way is close to the volume of gas produced by the anode and the cathode, and is the minimum calculated by Formulae (I) and (II) described above. The operation for electrolyzing water using the electrolyzer shown in FIG. 3 is the same as when using the electrolyzer shown in FIG. 1, and has the same effects.

The anode plate material may be gold, platinum, iron oxide, carbon fiber, graphite plate, or a platinum-group metal baked onto titanium. For the platinum-group metals, ruthenium, iridium, palladium, and oxides of these are preferred for their catalytic effect of increasing free chlorine production efficiency.

The cathode plate material may be gold, platinum, carbon fiber, graphite plate, or preferably a platinum-group metal baked onto titanium. High-chromium stainless steel (SUS 316L) or nickel may also be used. The electrode plates can be adhered or not adhered to the membranes. When using electrodes adhered to the membranes, plates or meshes with many holes are preferably used for the electrode plates. When the electrodes and membranes are used without adhering, that is, with a gap between them, the electrode plates can have holes or no holes.

When using electrode plates with many holes adhered to the membranes as described above, the side of each electrode plate facing the membrane is coated with a nonconductive material; for example, a synthetic resin such as a fluorinated resin (trade name: Teflon®), ABS resin, acrylic resin, epoxy resin, polyurethane resin, polyethylene resin, polypropylene resin, nylon resin, polyethylene terephthalate resin, polyamide resin, or vinyl chloride resin, an elastomer such as natural rubber, SBR, chloroprene, or polybutadiene, or a material such as silica or titanium oxide. Such an electrode plate is described in U.S. Pat. No. 5,674,365.

This electrode plate helps to prevent electrolysis by the electrode on the side contacting the membrane, and therefore is preferred because it can reduce the phenomenon of ions produced on the electrode surface migrating to the counter electrode, and the phenomenon of gas collecting between the electrode and the membrane blocking the current.

The membranes may be a material with porosity; e.g., a fabric such as polyvinyl fluoride fiber, asbestos, glass wool, polyvinyl chloride fiber, polyvinylidene chloride fiber, polyester fiber, or aromatic polyamide fiber, or an unwoven fabric. Alternately, a fabric such as polyester fiber, nylon fiber, or polyethylene fiber may be used as the foundation material, and the membranes may be chlorinated polyethylene, polyvinyl chloride, polyvinylidene fluoride, or a blend of these with titanium oxide.

Semitransparent membranes such as cellophane, or materials such as cation exchange membranes or anion exchange membranes may be are used as membranes with little porosity.

Because the electrolysis conditions described herein produce extremely acidic or alkaline electrolytic water by subjecting a small amount of water for electrolysis to a high current, and also because these conditions produce a large amount of chlorine gas, a material able to withstand these conditions is preferably selected for the membrane material.

In another embodiment, electrolytic water is produced by a method in which the membrane separating the anode chamber from the intermediate chamber is an anion exchange membrane, and anode plates are placed in the anode chamber with at least two electrode plates.

The longevity of hypochlorous acid, the main component of free chlorine, is represented by a chemical equilibrium formula based on Formula (VII), but is shortened by a high hydrogen ion concentration, i.e., a low pH, and generated chlorine gas. Similarly, it is clear that chlorine gas is generated even with a high chloride ion concentration. In addition, the source of the potent bactericidal effect exhibited by acidic electrolytic water is the free chlorine contained in the form of hypochlorous acid, and it is known that raising the free chlorine content maintains a bactericidal effect regardless of whether the pH is high or low. Therefore, acidic electrolytic water having an increased hypochlorous acid content while maintaining a reduced chloride content has been found to be effective both in terms of the magnitude of the bactericidal effect and for prolonging the duration of the bactericidal effect.

Described herein is a method capable of producing acidic electrolytic water that maintains a sufficiently high free chlorine content (at least 15 ppm) and is able to dramatically reduce the amount of electrolyte such as chloride ions mixed in as impurities, resulting in a longer bactericidal effect and resistance to metal corrosion.

Figure 4:
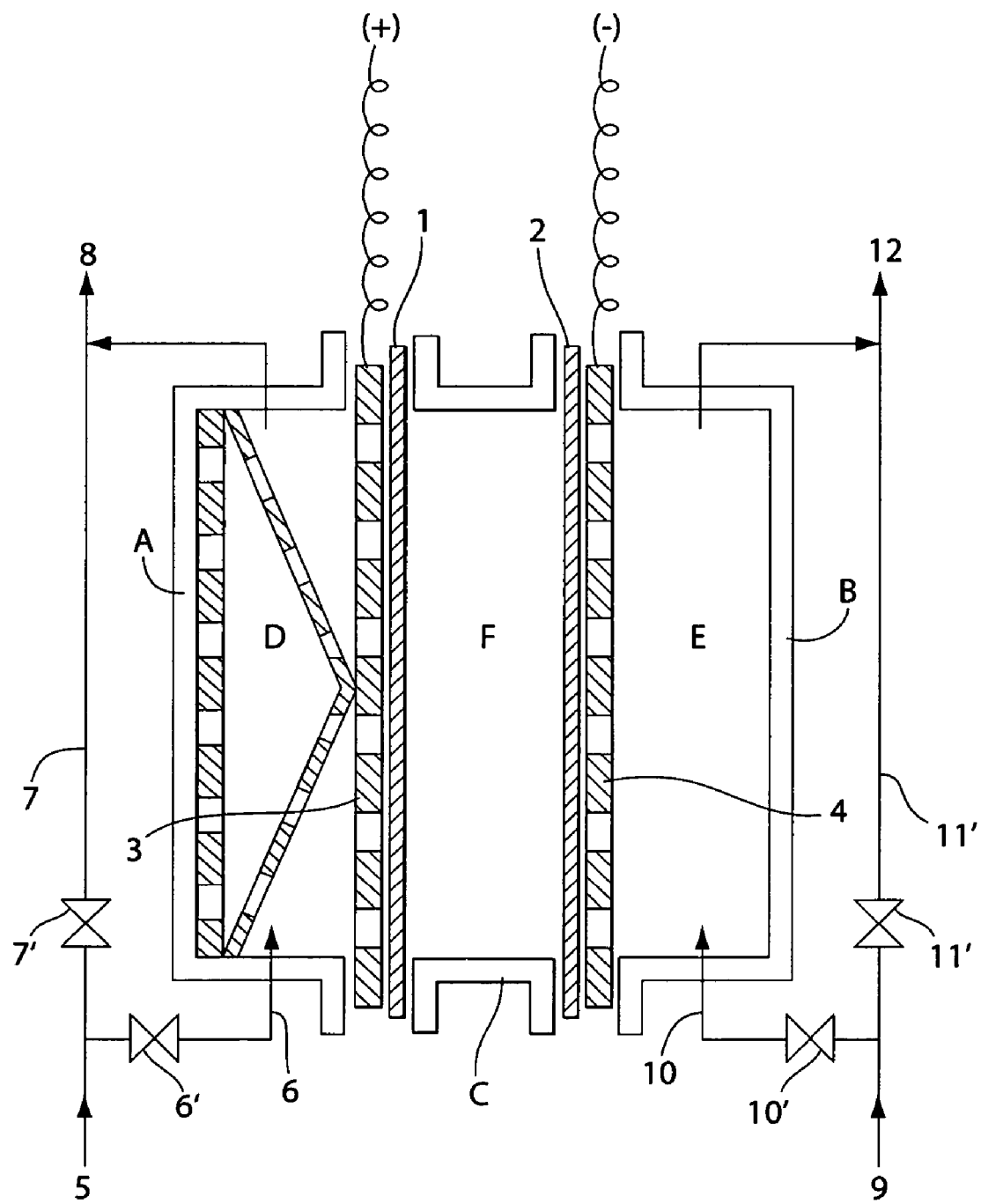
Figure 5:
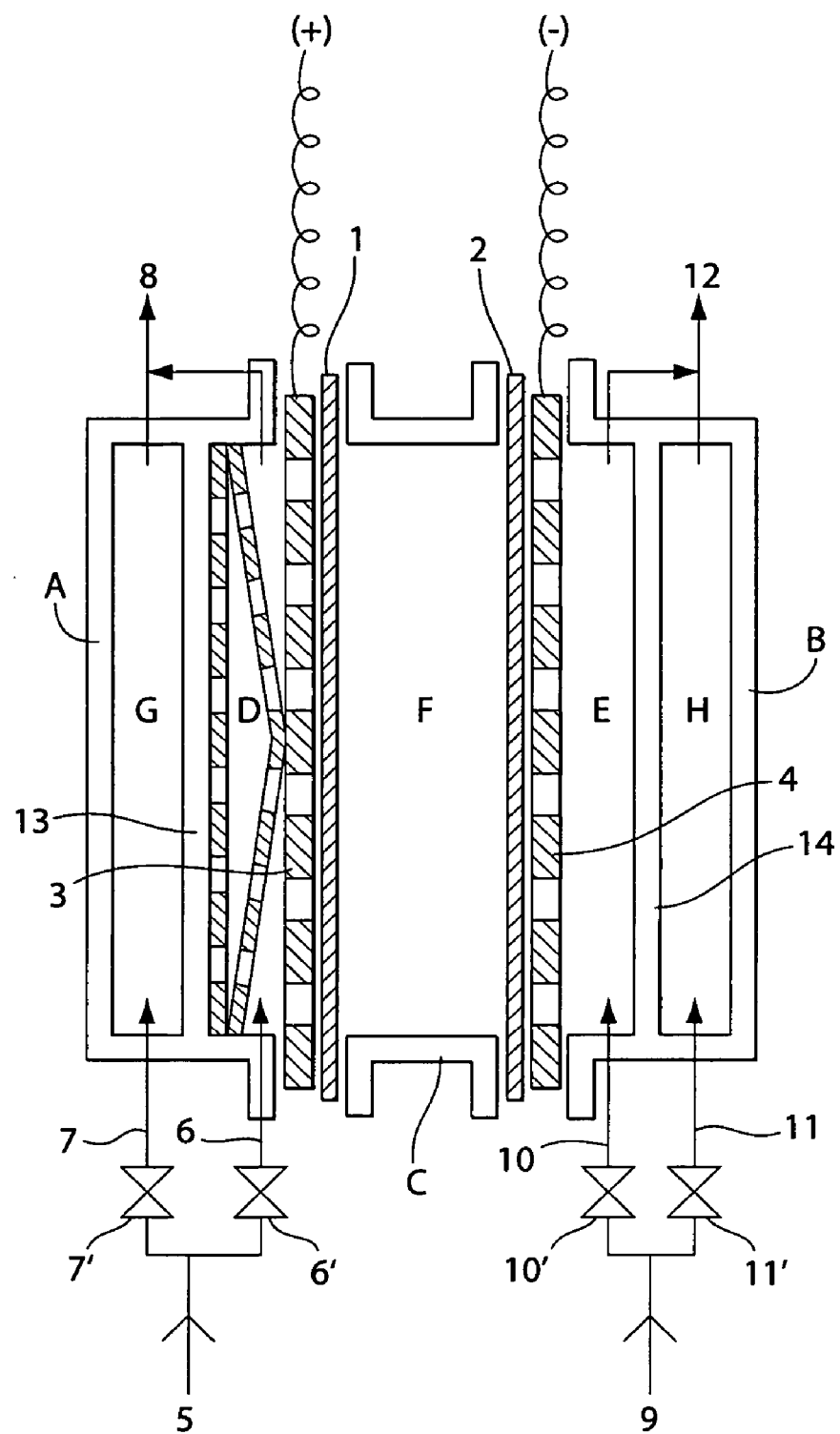

FIGS. 4 and 5 are cross sections of an electrolyzer for electrolyzing water as described herein.

FIG. 4 is a section of one example of a water electrolyzer used in an embodiment described herein. This water electrolyzer is provided with an anode chamber, an intermediate chamber, and a cathode chamber separated or partitioned by two membranes. Side walls of the electrolytic bath are (A), (B) and (C). This electrolytic bath is partitioned into anode chamber (D) and cathode chamber (E) by membrane (1). An anion exchange membrane may be used for this membrane (1). The bath is also partitioned between intermediate chamber (F) and cathode chamber (E) by membrane (2). A cation exchange membrane or a woven or unwoven fabric may be used for this membrane (2). Holes are made in anode plate(s) (3) and cathode plate(s) (4). Anode plates (3) may be placed with at least two electrode planes in contact; that is, with the electrode plates electrically conducting. These electrode plates may be placed as desired, and may be placed parallel or not parallel to the direction that water for electrolysis is flowing. In addition, anode plates (3) and membrane (1), and cathode plates (4) and membrane (2) may be separated or adhered together. FIG. 4 shows each plate and membrane adhered together. Membrane (1) and membrane (2) may also be adhered to rigid plates, e.g., synthetic resin. The plate shown in FIG. 2 is used for these rigid plates.

In FIG. 4, feed water (5) supplied to the electrolysis anode side is divided into water for electrolysis (6) and water not for electrolysis (7). Water for electrolysis (6) is conducted through anode chamber (D), and after electrolyzing, is mixed and diluted with water not for electrolysis (7) to produce electrolytic water (8) of the desired acidity. Feed water (9) on the cathode side is also divided into water for electrolysis (10) and water not for electrolysis (11). Water for electrolysis (10) is conducted through cathode chamber (E), and after electrolyzing, is mixed and diluted with water not for electrolysis (11) to produce electrolytic water (12) of the desired alkalinity. Valves (6'), (7'), (10'), and (11') are valves for adjusting the amount of water. Orifices or capillaries may be used instead of valves. Intermediate chamber (F) is filled with a concentrated aqueous electrolytic solution containing chloride ions. Normally, an aqueous solution of at least 10% potassium chloride or sodium chloride is used, and may be supplied from an aqueous electrolytic solution tank installed separately using a pump or the like.

FIG. 5 shows an example having a channel for water not for electrolysis installed inside side walls (A) and (B) of the electrolytic bath in FIG. 4, with a function for cooling the electrolytic bath attached. That is, in this embodiment, membrane (13) is installed on the inside of side wall (A) on the anode side, and channel (G) for conducting water not for electrolysis (7) is installed in the gap between side wall (A) and membrane (13). In this construction, water for electrolysis (6) to be conducted through the anode chamber is introduced into anode chamber (D), water not for electrolysis (7) is introduced into channel (G), water for electrolysis electrolyzed in the anode chamber is mixed again with water not for electrolysis (7) conducted through the channel near the outlet, and this water is discharged by a pipe (8). Moreover, the electrolyzed water may be mixed with the non-electrolyzed water in a pipe where the water is expelled from the electrolytic bath, or holes may be made near the top outlet of partition wall (13) and electrolyzed water may be conducted to channel (G) through these holes and mixed with non-electrolyzed water there before discharging from the pipe (8). Water for electrolysis (6) may be introduced as follows: (i) directly from inlets formed in the bottom of the anode chamber, (ii) feed water may be first introduced into channel (G), then introduced into the anode chamber from holes bored in the bottom of membrane (13), or (iii) water may be introduced from holes in the top of membrane (13) by replacing water produced by electrolysis and gas.

In addition, membrane (14) may be installed on the inside of side wall (B) facing the cathode, and channel (H) for conducting water not for electrolysis (11) may be installed in the gap between side wall (B) and membrane (14). In this construction, water for electrolysis (10) to be conducted through the cathode chamber is introduced into cathode chamber (E), water not for electrolysis (11) is introduced into channel (H), water for electrolysis electrolyzed in cathode chamber (E) is mixed again with water not for electrolysis conducted through channel (H) near the outlet, and this water is discharged by a pipe (12). Moreover, the electrolyzed water may be mixed with the non-electrolyzed water in the connecting pipe where the water is expelled from the electrolytic bath, or holes may be made near the top outlet of partition wall (14) and electrolyzed water may be conducted to channel (H) through these holes and mixed with non-electrolyzed water there before discharging from the pipe (12). Water for electrolysis (10) may be introduced as follows: (i) directly from inlets formed in the bottom of the cathode chamber, (ii) feed water may be first introduced into channel (H), then introduced into the cathode chamber from holes in the bottom of membrane (14), or (iii) water may be introduced from holes in the top of membrane (14) by replacing water produced by electrolysis and gas. The apparatus in FIG. 5 shows the anode side, the apparatus in FIG. 4 shows the cathode side, and these configurations may used in combination. The water flowing in channels (G) and (H) has the effect of cooling the heat produced inside the anode chamber and the cathode chamber during electrolysis. Moreover, the electrode plates and membranes in FIGS. 4 and 5 are used in the manner as described above.

Figure 6:
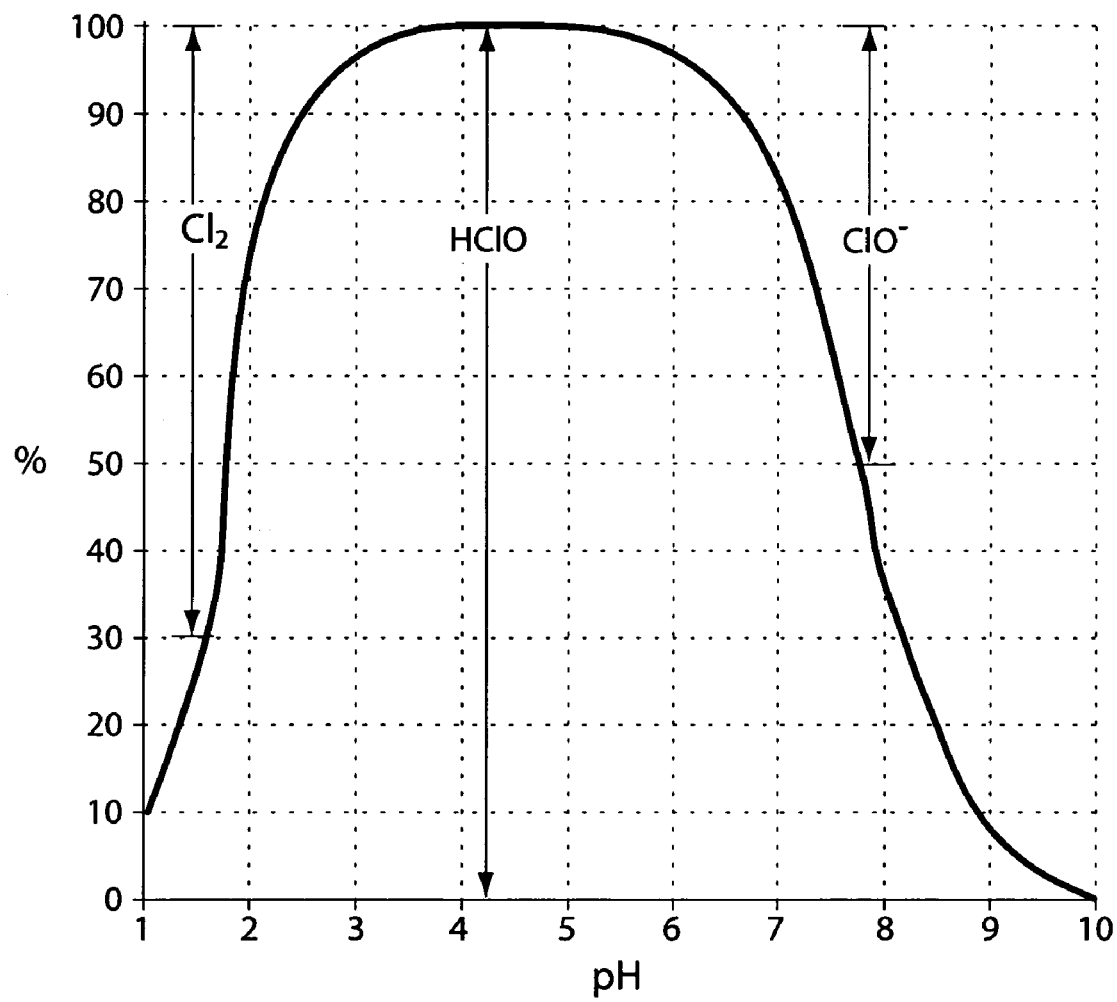
FIG. 6 is a graph showing the ratio of chlorine, hypochlorous acid and hypochlorite ion present in chemical equilibrium at different pH levels.

FIG. 6 shows the distribution of the three modes of free chlorine, $Cl_2$, HClO, and $ClO^-$, against change in pH. FIG. 6 shows that the percentage of $ClO^-$ ions with weak bactericidal effect is undesirably increased at pH 7 and higher. FIG. 6, however, shows only pH as the independent variable. When Formula (VII) is analyzed from the standpoint of chemical equilibrium, $Cl^-$ ions are also involved in chemical equilibrium, in addition to pH. That is, the chemical equilibrium shifts to the left when pH is low (high hydrogen ion concentration), and the chemical equilibrium also shifts to the left and produces more $Cl_2$ when $Cl^-$ ions are increased.

Figure 7:
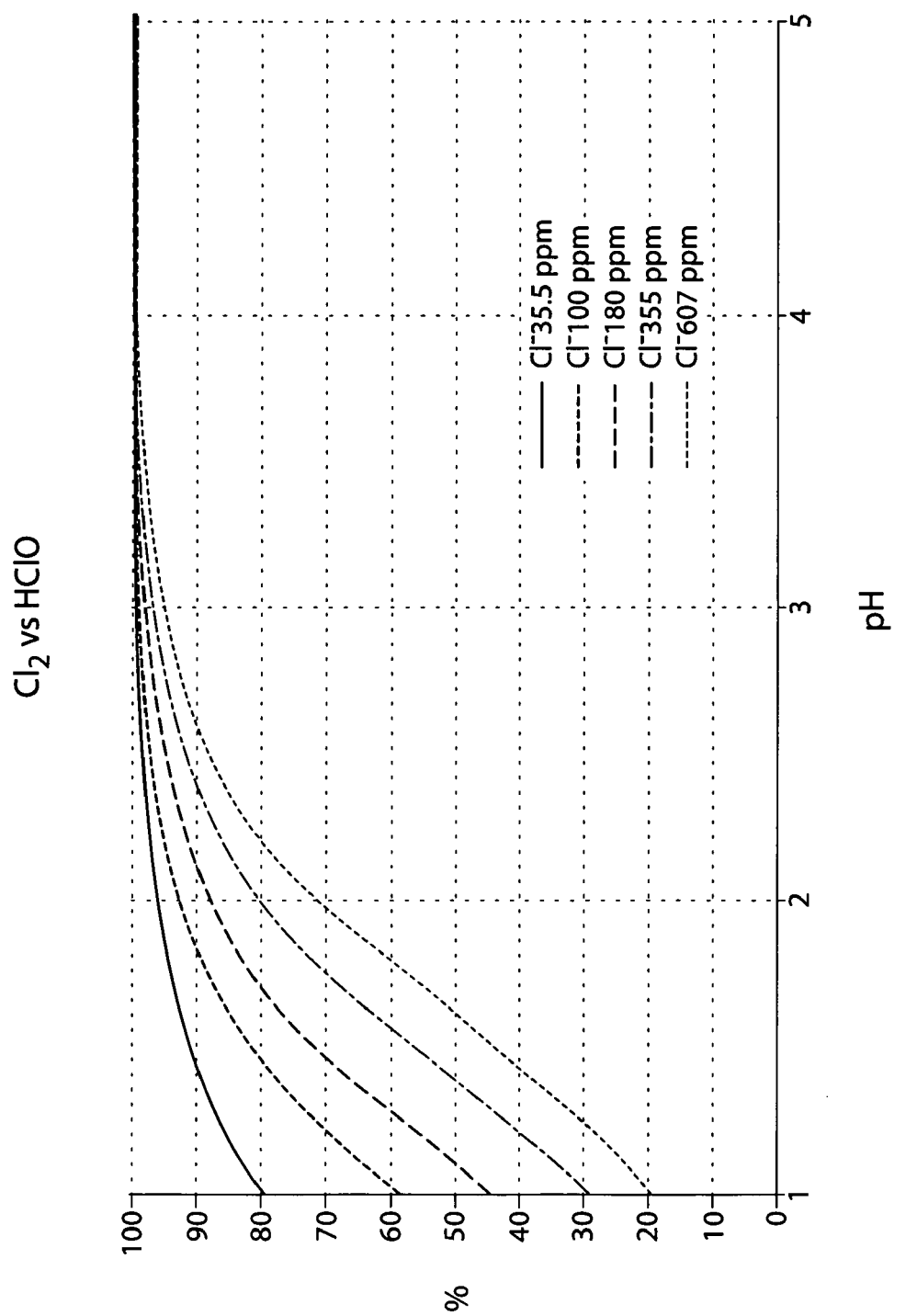
FIG. 7 is a graph showing the correlation between free chlorine and pH when the concentration of chloride ions varies.

FIG. 7 shows this correlation computed in detail. This shows that the percentage of chlorine gas ($Cl_2$) as a component of effective chlorine increases when pH is lowered. Furthermore, the percentage of chlorine gas ($Cl_2$) as a component of effective chlorine increases when the content of chloride ions ($Cl^-$ ions) increases. In FIG. 7, the curve labeled 607 ppm equates to the typical sodium chloride concentration of 1000 ppm encountered in previous electrolyzers. However, because chlorine gas ($Cl_2$) has a greater tendency to evaporate than hypochlorous acid (HClO), the duration of bactericidal effect is undesirably shortened when the concentration of chlorine gas increases. In uses where bactericidal effects are sought, therefore, it is desirable to minimize the portion of free chlorine represented by chlorine gas ($Cl_2$).

Figure 8:
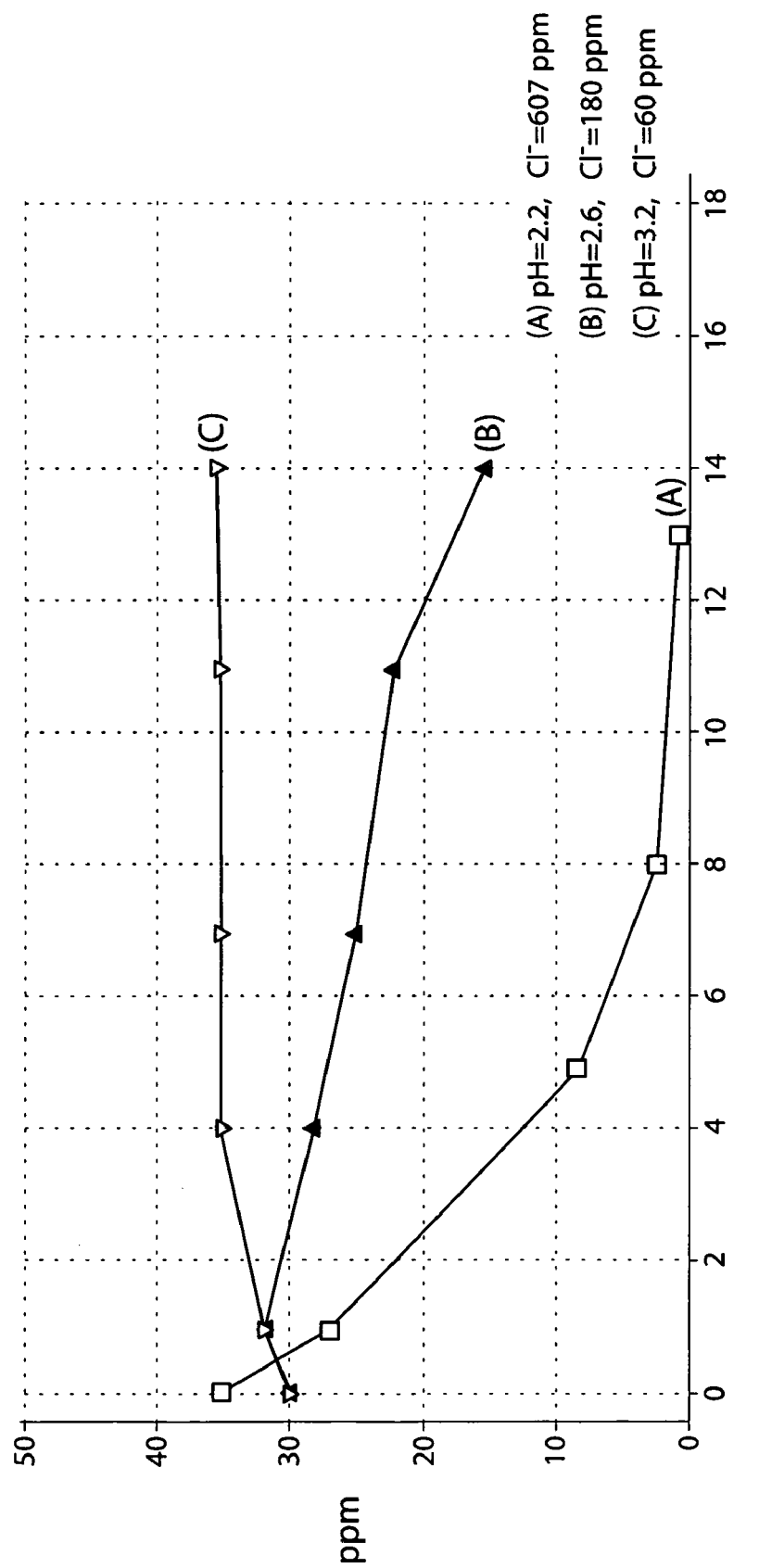
FIG. 8 is a graph showing change over time in free chlorine in acidic electrolytic water.
Figure 9:
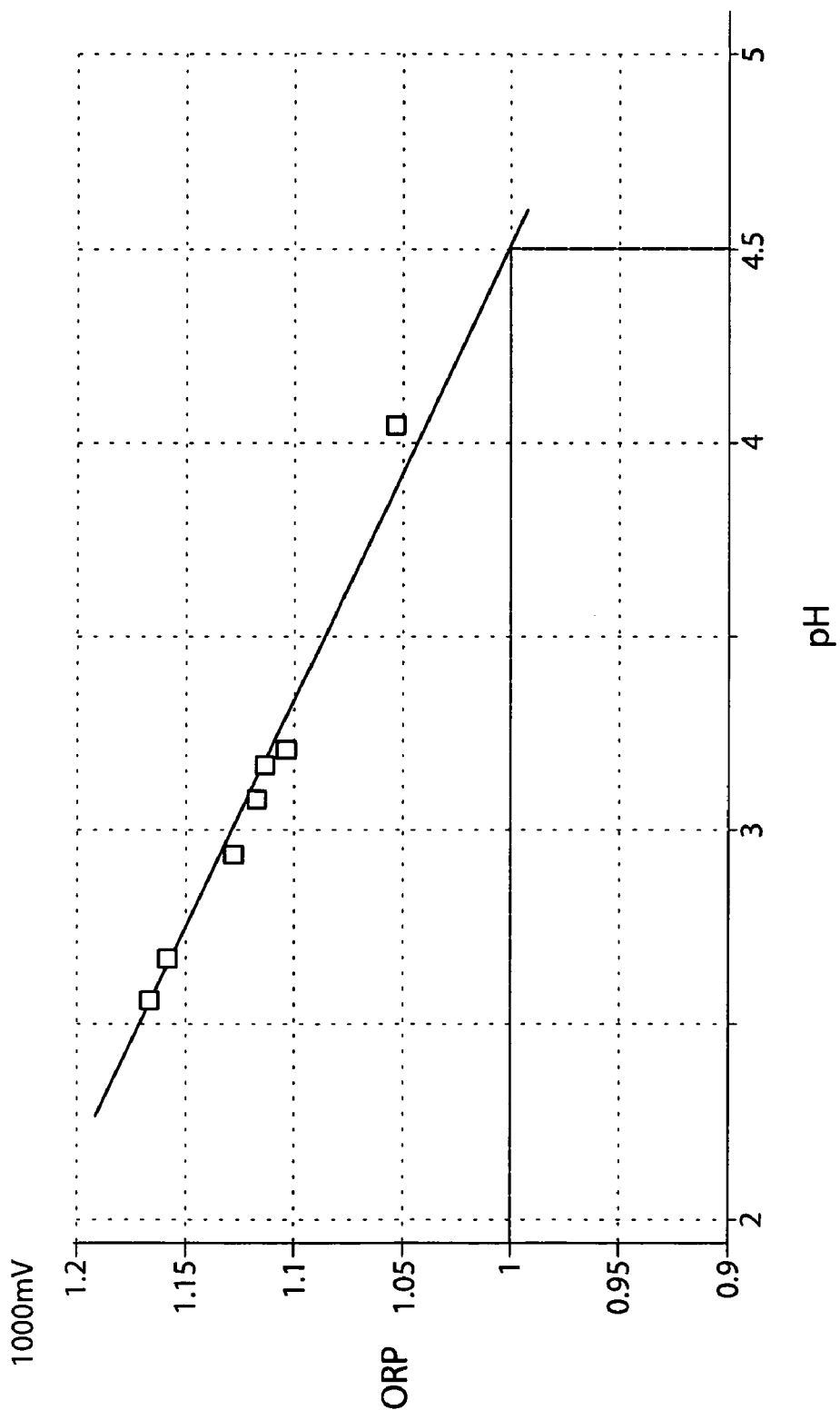
FIG. 9 is a graph showing change in oxidation reduction potential (ORP) with increasing pH.

FIG. 8 is a graph relating to (A) acidic electrolytic water produced by previous methods by adding approximately 1000 ppm (=607 ppm $Cl^-$ ions) aqueous saline solution to the feed water with pH at 2.2, (B) acidic electrolytic water produced by the methods described herein with 180 ppm concentration of chlorine ions (Cr ions) at pH 2.6, and (C) acidic electrolytic water produced by the methods described herein with 660 ppm concentration of chlorine ions ($Cl^-$ ions) at pH 3.2, showing change over time in free chlorine content of the three samples of acidic electrolytic water measured after storage of each of the acidic electrolytic waters in an open PET bottle. According to FIG. 8, free chlorine content, which is most correlated with bactericidal effect as explained above, decreases with time at rates in the order (A)>(B)>(C).

Because at least two electrode plates are placed contacting and electrically conducting as the anode electrodes in the anode chamber in the preferred embodiment, the reaction based on Formula (IV) given above can be performed efficiently on chloride ions migrating into the anode chamber. In this embodiment, a small amount of the feed water supplied to the electrolyzer is mixed with water for electrolysis and this small amount of water for electrolysis is subjected to a current of at least 1500 coulombs/liter. Placing only one electrode in the anode chamber in such a case allows chloride ions to pass through the holes bored in the electrode without electrolyzing on the electrode surface, with the result that the chloride ion content in the acidic electrolytic water produced is increased. When at least two electrode plates are placed in the anode chamber such that they are electrically conducting, however, chloride ions are efficiently replenished, and the reaction of Formula (IV) given above is performed efficiently. As a result, the free chlorine content in the acidic electrolytic water produced can be increased to at least 15 ppm, and chloride ion concentration can be reduced to no more than 100 ppm. Placing at least two electrode plates in the anode chamber such that they are electrically conducting has also been found to lower the electrolysis voltage and increase electrolysis efficiency.

According to the methods described herein, acidic electrolytic water can be produced with a pH of up to about 5, with at least 15 ppm free chlorine content and no more than 100 ppm chloride ion concentration. That is, strongly acidic water of about pH 2.0 with 300 to 1200 ppm free chlorine content can be produced inside the anode chamber before mixing with the water not for electrolysis, and acidic water with various pH levels and free chlorine content can be produced by varying the ratio of feed water and water for electrolysis; i.e., by raising or lowering the percentage of water for electrolysis when mixing with water not for electrolysis.

Acidic electrolytic water produced by known method ranges from pH 2.3 to 2.7 at a typical 10 to 60 ppm free chlorine content, has 335 ppm (0.01 mol) or greater chloride ion concentration and a strong chlorine odor, and exhibits problems such as metal corrosion or a short duration of bactericidal effect. By contrast, acidic electrolytic water produced by this invention has a higher pH range of about 3 to about 5, maintains at least 15 ppm free chlorine content, and can reduce the chloride ion concentration to no more than 100 ppm. When the chloride ion concentration is no more than 100 ppm, the percentage of easily evaporating chlorine gas is reduced and hypochlorous acid (HClO) is retained longer. As a result, the duration of bactericidal effect can be prolonged, and effects such as corrosion or rusting of metals are reduced.

In another embodiment, electrolytic water is produced by making the membrane separating the cathode chamber from the intermediate chamber in the above-disclosed embodiments a cation exchange membrane. This embodiment can produce electrolytic water continuously over a long period without scale adhering to the cathode. This effect is achieved regardless of the placement of electrodes in the anode chamber; i.e., whether one electrode or more are placed in the anode chamber.

The reason why this phenomenon of scale adhering to the cathode can be reduced will be explained. The main electrolysis reactions occurring at the cathode are as follows:

$$2H_2O + 2e^- \rightarrow H_2 + 2OH^- \quad (IX);$$

$$Na^+ + e^- \rightarrow Na \quad (X);$$

$$2Na + 2H_2O \rightarrow 2Na^+ + 2OH^- + H_2 \quad (XI).$$

As these equations show, hydroxyl ions and hydrogen gas are produced at the cathode, metallic ions such as sodium ion are reduced to become metals, and these react with water. If the water contains ions such as calcium or magnesium during electrolysis these ions are also reduced to metals, and components such as calcium and magnesium produce hydroxides. As a result, these compounds are often deposited on the surface of the electrode as scale.

The phenomenon of scale adhering to the cathode during electrolysis in this way has previously been considered unavoidable, and measures such as removing "hard" components contained in the feed water using water softening equipment or the like, scrubbing scale adhering to the electrode using an acid, or removing scale by reversing the polarity of the electrodes have been adopted as measures for preventing scale adhesion. The current flow through the water for electrolysis conducted through the cathode chamber when producing alkaline electrolytic water by previously-known methods is about 12 amperes per liter (720 coulombs/liter), but precipitation of scale onto the surface of the cathode is often observed under these conditions. As a result of using the electrode described in Japan Unexamined Patent 8-276184, and visually observing the electrode surface during electrolysis using an electrolyzer having a cathode chamber with side walls fabricated of a clear material and investigating conditions under which scale does not precipitate onto the cathode, it was observed that scale does not precipitate onto the electrode surface when the water conducted through is carrying a current of at least 1500 coulombs/liter, and preferably at least 1800 coulombs/liter, and the cathode chamber is strongly alkaline with at least 12.1 pH. It is believed that the reason for this is that many scale components are dissolved or inhibited from precipitating as crystals under strongly alkaline conditions.

EXAMPLES

Example 1

This example describes using the water electrolyzer shown in FIG. 3. The size of the electrolytic bath was 5 cm long, 9 cm wide, and 6 cm thick. An electrode having platinum/lithium oxide baked onto a titanium plate with an effective surface area of 50 cm$^2$ and having many holes in it was used as the anode plate (3), and an electrode having platinum plated on a titanium plate with an effective surface area of 50 cm$^2$ and having holes in it was used as the cathode plate (4). The nonconductive material of a fluorinated resin (Teflon®) sheet with holes was laminated on the side of each electrode plate facing the membrane. An MF film of unwoven fabric was used for membrane (1) separating the anode chamber from the intermediate chamber, and a cation exchange resin film was used for membrane (2) separating the cathode chamber from the intermediate chamber.

The rigid plates shown in FIG. 2 were used on these membranes (1) and (2), and were made of synthetic resin. The size of the synthetic resin plates was 50 mm×110 mm, the width of their striped projections was 2.5 mm, and the width of their depressions was 1.5 mm. These striped depressions and projections were arranged crossing perpendicularly at a slope of 90° to vertical. The thickness, after laminating, of these projections and depressions is 5.0 mm, and matches the width of the intermediate chamber.

Intermediate chamber (F) was filled with an approximately 30% concentration aqueous sodium chloride solution. The electrolyzer was partitioned on the anode side into anode chamber (D) and water channel (G) by partition plate (13) installed between side wall (A) and anode plate (3). Water for electrolysis (6) was conducted through anode chamber (D), water not for electrolysis (7) was conducted through water channel (G) for the purpose of cooling the electrolytic bath, and the two waters were mixed again where they exited the electrolytic bath, then being discharged from outlet (8). Similarly, the electrolyzer was partitioned on the cathode side into cathode chamber (E) and water channel (H) by partition plate (14) installed between side wall (B) and cathode plate (4). Water for electrolysis (10) was conducted through cathode chamber (E) and water for other purposes (11) was conducted through water channel (H) for the purpose of cooling the electrolytic bath, then these were mixed again and discharged from outlet (12).

The direct current charging the electrode plate was 9.0 amperes, and the voltage was 6–7 volts. The amount of water for electrolysis (6) conducted through the anode chamber was set at 0.1 liter/minute, the amount of water (7) conducted through water channel (G) was set at 1.25 liters/minute, and 1.35 liters/minute of acidic electrolytic water were obtained by mixing these near the outlet from the electrolyzer. The acidic electrolytic water obtained was pH 2.68, and had 1130 mV ORP and 90 ppm free chlorine content. Similarly, the amount of water for electrolysis (10) conducted through the cathode chamber was set at 0.1 liter/minute, the amount of water (11) conducted through water channel (H) was set at 0.9 liter/minute, and alkaline electrolytic water was obtained by mixing these near the outlet from the electrolyzer. The alkalinity obtained was pH 11.54. The electrolysis current (6) in this example was set to 9.0 amperes (5400 coulombs/liter). When tested continuously for 48 hours under these conditions, absolutely no scale was found adhering to the cathode. The solution transport phenomenon of solution migrating from the anode to the cathode was also not found.

Next, a test was conducted by varying the amount of water conducted through the anode chamber and the amount of water conducted through water channel (G) while keeping constant the pH of the acidic electrolytic water. The fluctuation in free chlorine content was measured, and the solution transport phenomenon was observed. The results are shown in Table 1. As free chlorine content decreased with increase in the amount of water for electrolysis in the anode chamber, it was found that the solution transport phenomenon occurred at currents of 1350 and 338 coulombs/liter, and the water level in the intermediate chamber rose.

TABLE 1

| Voltage V | Current A | Power Consumption W | Water for Electrolysis L/min | Water Not for Electrolysis L/min | pH | ORP mV | Free Chlorine ppm | Current Charge coulombs/L | Solution Transport Phenomenon |
|---|---|---|---|---|---|---|---|---|---|
| 6.5 | 9.0 | 58.5 | 0.03 | 1.35 | 2.68 | 1143 | 125 | 23700 | none |
| 6.7 | 9.0 | 60.3 | 0.1 | 1.35 | 2.68 | 1139 | 90 | 5400 | none |
| 6.7 | 9.0 | 60.3 | 0.2 | 1.45 | 2.68 | 1138 | 90 | 2700 | none |
| 6.8 | 9.0 | 61.2 | 0.3 | 1.50 | 2.68 | 1137 | 85 | 1800 | none |
| 6.9 | 9.0 | 62.1 | 0.4 | 1.50 | 2.68 | 1136 | 75 | 1350 | some |
| 7.0 | 9.0 | 63.0 | 1.6 | 1.60 | 2.68 | 1133 | 40 | 338 | much |

Example 2

The same operations as Example 1 were performed using the same electrolyzer except for using an anode of platinum plated on a titanium plate instead of platinum/lithium oxide baked onto a titanium plate. Investigating the production efficiency of effective chlorine in this case gave the results shown in Table 2. From Table 2, it can be confirmed that a high content of chlorine was produced.

TABLE 2

| Voltage V | Current A | Power Consumption W | Water for Electrolysis L/min | Water Not for Electrolysis L/min | pH | ORP mV | Free Chlorine ppm |
|---|---|---|---|---|---|---|---|
| 5.8 | 8.9 | 51.6 | 0.03 | 1.5 | 2.86 | 1138 | 130 |
| 6.2 | 8.9 | 55.2 | 0.1 | 1.5 | 2.74 | 1141 | 110 |
| 6.4 | 8.9 | 57.0 | 0.2 | 1.5 | 2.72 | 1142 | 105 |

Example 3

This example describes the water electrolyzer shown in FIG. 5. An electrode having platinum/lithium oxide baked onto a titanium plate with an effective surface area of 50 cm$^2$ and holes (diameter: 1.0 to 3.0 mm) was used as the anode electrode plate (3). Two, three, and five plates were used as anode electrode plates, and measurements were taken for each combination. When several electrodes were used, part of each of the electrode plates are in electrical contact. An electrode having platinum plated on a titanium plate with an effective surface area of 50 cm$^2$ (square centimeters) and holes (diameter: 1.0 to 3.0 mm) was used as cathode plate (4). A cation exchange resin film was used for membrane (1) separating the anode chamber from the intermediate chamber, and an anion exchange resin film was used for membrane (2) separating the cathode chamber from the intermediate chamber. Intermediate chamber (F) was filled with an approximately 30% concentration aqueous sodium chloride solution. The synthetic resin plates used to adhere to membrane (1) and membrane (2) were the same type as used in Example 1.

The current through the electrode plates was uniformly 7.5 amperes. The feed water supplied to the anode side was divided into water for electrolysis and water not for electrolysis. The amount of water for electrolysis was fixed at 100 cc/minute, and the amount of water not for electrolysis was adjusted to control the pH of the acidic electrolytic water produced, by mixing the two waters, within a range of pH 2.6 to 2.7. The feed water supplied to the cathode side was also divided into water for electrolysis and water not for electrolysis. The amount of these was set at 100 cc/minute water for electrolysis, and 900 cc/minute water not for electrolysis.

Cases using one electrode plate for the anode (Nos. 1 and 2) and a case using unwoven fabric for the membrane separating the anode chamber from the intermediate chamber (No. 1) are indicated at the same time as comparative examples.

Table 3 shows production conditions for acidic electrolytic water (number of electrodes, type of membranes, and current), the amount of power consumed and acidic electrolytic water produced, and measurements for the pH, oxidation reduction potential (ORP), free chlorine content, and chloride ion concentration of the acidic electrolytic water obtained.

TABLE 3

| No. | Electrode Plates (number) | Membrane (type) | Current (A) | Power Consumption (W) | Amount Produced (cc/min) | pH | ORP (mV) | Free chlorine (ppm) | Chloride Ions Cl$^-$ (ppm) |
|---|---|---|---|---|---|---|---|---|---|
| 1 | 1 | unwoven fabric | 9.0 | 80 | 1000 | 2.64 | 1130 | 25 | 200 |
| 2 | 1 | cation exchange membrane | 7.5 | 60 | 1000 | 2.60 | 1140 | 25 | 170 |
| 3 | 2 | cation exchange membrane | 7.5 | 40 | 1700 | 2.65 | 1165 | 28 | 100 |
| 4 | 3 | cation exchange membrane | 7.5 | 40 | 1700 | 2.67 | 1164 | 30 | 100 |
| 5 | 5 | cation exchange membrane | 7.5 | 50 | 1600 | 2.67 | 1160 | 35 | 100 |

As is clear from the results given above, power consumption was improved and the chloride ion concentration in the acidic electrolytic water was decreased by using a cationic exchange membrane (No. 2) compared to using an unwoven fabric for the membrane separating the anode chamber from the intermediate chamber (No. 1).

In addition, increasing the number of electrode plates used for the anode (Nos. 3 to 5) improved power consumption and increased production capacity. However, although some increase in free chlorine content was found comparing two plates (No. 3), three plates (No. 4), and five plates (No. 5), other parameters were nearly the same. Some increase in power consumption was found in the case of five plates. Chloride ion concentration decreased in all cases compared to use of one plate. In addition, no adhesion of scale to the cathodes was found.

Example 4

Table 4 shows examples of production conditions of at least pH 3.1, maintaining at least 15 ppm free chlorine, and restricted to no more than 100 ppm chloride ion concentration when using five electrode plates for the anode, and the data for this combination of conditions.

As shown in Table 5, the acidic electrolytic water produced by the methods described herein maintains a pH of at least pH 3.0 and adjusting free chlorine content within a range of 20 to 60 ppm using five electrode plates for the anode. This acidic electrolytic water is within the content range most often used in commercial applications.

Example 5

Metal corrosion tests were conducted and compared using acidic electrolytic water produced by the production method described herein and acidic electrolytic water produced by a commercial production apparatus. Spoons made of SUS 304 stainless steel and copper plates were used as the metals for the corrosion tests. The corrosion test method was to place the sample waters in separate cups, immerse the spoons and copper plates in each of these cups for five minutes, then observe any changes in the spoons and copper plates. The results are shown in Table 6.-

TABLE 4

| No. | Electrode Plates (number) | Membrane (type) | Current (A) | Power Consumption (W) | Amount Produced (cc/min) | pH | ORP (mV) | Free chlorine (ppm) | Chloride Ions $Cl^-$ (ppm) |
|---|---|---|---|---|---|---|---|---|---|
| 1 | 5 | cation exchange membrane | 4.5 | 20 | 1600 | 3.17 | 1110 | 25 | 60 |

The acidic electrolytic water of this invention shown in this Table 4 has pH 3.17, ppm free chlorine, and 60 ppm chloride ion concentration. In addition, as shown in the graph of FIG. 8, acidic electrolytic water of at least pH 3.1, maintaining at least 15 ppm free chlorine, and restricted to no more than 100 ppm chlorine ion concentration ("C" in FIG. 8) had a longer duration of free chlorine content effective for achieving a bactericidal effect compared to acidic electrolytic water with pH 2.7 or lower, about 1100 mV oxidation reduction potential, 10 to 40 ppm effective chlorine, and 300 to 700 ppm chloride ion concentration produced by the two-chamber electrolyzer generally used by others ("A" in FIG. 8).

TABLE 5

| No. | Electrodes (number) | Current (A) | Power Consumption (W) | Water for Electrolysis cc/min | Amount Produced cc/min | pH | Free Chlorine ppm | Chloride Ions $Cl^-$ ppm |
|---|---|---|---|---|---|---|---|---|
| 1 | 5 | 7 | 43 | 100 | 1400 | 3.02 | 55 | 55 |
| 2 | 5 | 7 | 43 | 100 | 1600 | 3.18 | 40 | 57 |
| 3 | 5 | 7 | 43 | 100 | 1600 | 3.13 | 30 | 67 |
| 4 | 5 | 7 | 43 | 100 | 1700 | 3.15 | 30 | 61 |
| 5 | 5 | 7 | 43 | 100 | 2100 | 3.35 | 23 | 51 |

Anode: platinum/iridium
Anode Membrane: anion exchange membrane
Cathode Membrane: cation exchange membrane
Anode Current: 4200 coulombs/liter

TABLE 6

| | Electrolytic Water Produced by This Invention | | | Electrolytic Water Produced by |
| --- | --- | --- | --- | --- |
| | 1 | 2 | 3 | Commercial Apparatus |
| pH | 2.13 | 2.64 | 3.17 | 2.14 |
| ORP (mV) | 1200 | 1167 | 1110 | 1165 |
| free chlorine (ppm) | 90 | 30 | 25 | 35 |
| evaporation residue (ppm) | 30 | 20 | 20 | 1039 |
| (SUS 304 spoons) | | | | |
| acidic electrolytic water status of metal surface (copper plates) | no change no change | no change no change | no change no change | discolored yellow discolored dark gray |
| acidic electrolytic water status of metal surface | no change discolored pale purple | no change discolored pale purple | no change discolored pale purple | discolored blue discolored dark purple |

While the foregoing has been with reference to particular embodiments of the invention, it will be appreciated by those skilled in the art that changes in these embodiments may be made without departing from the principles and spirit of the invention, the scope of which is defined by the appended claims.

What is claimed is:

1. A method for producing acidic electrolytic water and alkaline electrolytic water, comprising:
   (a) providing an electrolytic apparatus having:
      (i) an intermediate chamber, wherein the intermediate chamber is formed by contacting two rigid plates held together, and wherein each of the rigid plates has striped depressions and projections on the intermediate chamber side with holes in these depressions, and wherein the ends of the projections on one rigid plate contact the end of the projections on the other rigid plate, thereby forming a channel for electrolytic solution to flow through the intermediate chamber, and wherein the membranes are adhered to the outer surfaces of the rigid plates;
      (ii) an anode chamber, wherein the interior of the anode chamber and the interior of the intermediate chamber are connected by holes in the side of the anode chamber and the side of the intermediate chamber;
      (iii) a cathode chamber, wherein the interior of the cathode chamber and the interior of the intermediate chamber are connected by holes in the side of the cathode chamber and the side of the intermediate chamber;
      (iv) a membrane between the anode chamber and the intermediate chamber;
      (v) a membrane between the cathode chamber and the intermediate chamber;
      (vi) an anode electrode plate in the anode chamber; and
      (vii) a cathode electrode plate in the cathode chamber; and
   (b) electrolyzing water by the steps of:
      (i) causing an electrolytic solution to flow in the intermediate chamber;
      (ii) producing acidic electrolytic water by:
         (A) dividing the feed water supplied to the anode chamber into water for electrolysis and water not for electrolysis;
         (B) conducting said water for electrolysis through the anode chamber to be electrolyzed;
         (C) electrolyzing the water for electrolysis by charging the anode plate with at least 1500 coulombs of direct current per liter of water for electrolysis, thereby producing acidic electrolytic water; and
         (D) mixing the acidic electrolytic water discharged from the anode chamber with the water not for electrolysis in a proportion to produce acidic electrolytic water of a desired pH; and
      (iii) producing alkaline electrolytic water by:
         (A) dividing the feed water supplied to the cathode chamber into water for electrolysis and water not for electrolysis;
         (B) conducting said water for electrolysis through the cathode chamber to be electrolyzed;
         (C) electrolyzing said water for electrolysis by charging the cathode plate with at least 1500 coulombs of direct current per liter of water for electrolysis, thereby producing alkaline electrolytic water; and
         (D) mixing the alkaline electrolytic water discharged from the cathode chamber with the water not for electrolysis in a proportion to produce alkaline electrolytic water of a desired pH.

2. The method of claim 1, wherein the membrane between the anode chamber and the intermediate chamber is an anion exchange membrane.

3. The method of claim 1, wherein the membrane between the cathode chamber and the intermediate chamber is a cation exchange membrane.

4. The method of claim 1, wherein the anode chamber contains at least two anode electrode plates.

5. The method of claim 1, wherein the cathode chamber contains at least two cathode electrode plates.

6. The method of claim 1, wherein the anode chamber is subdivided into a chamber which contains an anode electrode plate and through which the water for electrolysis is conducted, and a chamber through which water not for electrolysis is conducted.

7. The method of claim 1, wherein the cathode chamber is subdivided into a chamber which contains a cathode electrode plate and through which the water for electrolysis is conducted, and a chamber through which water not for electrolysis is conducted.

8. The method of claim 1, wherein the membrane between the anode chamber and the intermediate chamber is adhered to a rigid plate.

9. The method of claim 8, wherein the rigid plate is made of synthetic resin or ceramic.

10. The method of claim 1, wherein the membrane between the cathode chamber and the intermediate chamber is adhered to a rigid plate.

11. The method of claim 10, wherein the rigid plate is made of synthetic resin or ceramic.

12. An apparatus for producing acidic electrolytic water and alkaline electrolytic water, comprising:
   (i) an intermediate chamber, through which an electrolytic solution flows, wherein the intermediate chamber is formed by contacting two rigid plates held together, and wherein each of the rigid plates has striped depressions and projections on the intermediate chamber side with holes in these depressions, and wherein the ends of the projections on one rigid plate contact the end of the projections on the other rigid plate, thereby forming a channel for electrolytic solution to flow through the intermediate chamber, and wherein the membranes are adhered to the outer surfaces of the rigid plates;
   (ii) an anode chamber, wherein the interior of the anode chamber and the interior of the intermediate chamber are connected by holes in the side of the anode chamber and the side of the intermediate chamber, and through which water for electrolysis flows;
   (iii) a cathode chamber, wherein the interior of the cathode chamber and the interior of the intermediate chamber are connected by holes in the side of the cathode chamber and the side of the intermediate chamber, and through which water for electrolysis flows;
   (iv) a membrane between the anode chamber and the intermediate chamber;
   (v) a membrane between the cathode chamber and the intermediate chamber;
   (vi) an anode electrode plate in the anode chamber; and
   (vii) a cathode electrode plate in the cathode chamber.

13. The apparatus of claim 12, wherein the membrane between the anode chamber and the intermediate chamber is an anion exchange membrane.

14. The apparatus of claim 12, wherein the membrane between the cathode chamber and the intermediate chamber is a cation exchange membrane.

15. The apparatus of claim 12, wherein the anode chamber contains at least two anode electrode plates.

16. The apparatus of claim 12, wherein the cathode chamber contains at least two cathode electrode plates.

17. The apparatus of claim 12, wherein the anode chamber is subdivided into a chamber which contains an anode electrode plate and through which the water for electrolysis is conducted, and a chamber through which water not for electrolysis is conducted.

18. The apparatus of claim 12, wherein the cathode chamber is subdivided into a chamber which contains a cathode electrode plate and through which the water for electrolysis is conducted, and a chamber through which water not for electrolysis is conducted.

19. The apparatus of claim 12, wherein the membrane between the anode chamber and the intermediate chamber is adhered to a rigid plate.

20. The apparatus of claim 19, wherein the rigid plate is made of synthetic resin or ceramic.

21. The apparatus of claim 12, wherein the membrane between the cathode chamber and the intermediate chamber is adhered to a rigid plate.

22. The apparatus of claim 21, wherein the rigid plate is made of synthetic resin or ceramic.

* * * * *